United States Patent

[11] 3,581,858

| | | |
|---|---|---|
| [72] | Inventor | William J. Haley<br>Muncie, Ind. |
| [21] | Appl. No. | 756,758 |
| [22] | Filed | Sept. 3, 1968 |
| [45] | Patented | June 1, 1971 |
| [73] | Assignee | Borg-Warner Corporation<br>Chicago, Ill. |

[54] FLUID ACTUATOR
1 Claim, 1 Drawing Fig.

[52] U.S. Cl. .................................................. 192/106
[51] Int. Cl. ........................................... F16d 25/063,
F16d 25/02
[50] Field of Search ........................................... 192/106 F

[56] References Cited
UNITED STATES PATENTS
2,876,743  3/1959  Maki ........................... 92/108
3,215,237  11/1965  Davies ........................ 192/77.14

*Primary Examiner*—Douglas Hart
*Attorneys*—Donald W. Banner, Lyle S. Motley, C. G. Stallings and William S. McCurry ABSTRACT: A fluid actuator for a friction device adapted for installation in a transmission mechanism including an annular piston mounted in an annular chamber provided in a rotary housing including passage means to supply fluid to move said piston and including a balance chamber adapted to receive lubricating fluid from the transmission whereby when fluid is exhausted from said passage means to disengage said friction device, centrifugal actuation of the residual fluid in said fluid passage and the actuating-fluid chamber will be balanced by centrifugal actuation of the fluid contained within the balance chamber.

PATENTED JUN 1 1971
3,581,858
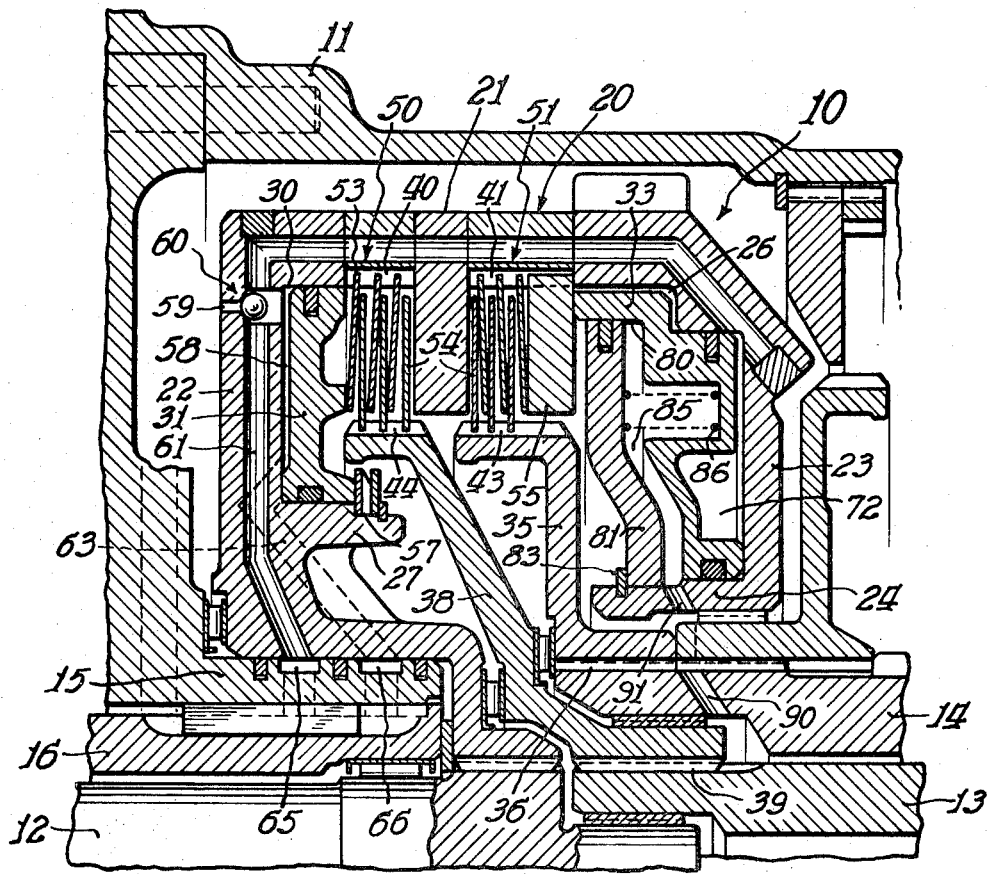
Inventor:
William J. Haley
By: Robert L. Zieg Atty.

3,581,858

FLUID ACTUATOR

SUMMARY OF INVENTION

In rotating friction devices for transmission structures it is known to provide centrifugal ball mechanisms to release fluid from the device when the friction device is disengaged whereby centrifugal force acting on the residual fluid will not actuate the piston and engage the friction device at an undesirable time. In certain structures wherein the friction device and its actuator always rotate at engine speed and also relatively large diameters are involved it has been found that a centrifugal ball mechanism will not prevent centrifugal force from actuating the pistons. In most installations where a centrifugal ball mechanism is used as is known in the prior art, the servomotor is actuated while the housing for the servomotor is stationary. In the instant device the servomotor is actuated while rotating at engine speed. If the angle of the tapered ball seat is designed such that the ball will readily seat while the servomotor is rotating at engine speed it has been found that the ball will then not move away from the hole when fluid pressure is exhausted from the servomotor and centrifugal actuation of the servomotor is not prevented.

Accordingly, the present invention provides a balance chamber within the actuator piston on the opposite side of the piston from the fluid apply chamber, the balance chamber being supplied with surplus fluid from the lubricating circuit for the transmission wherein the chamber sizes are so designed that when fluid is exhausted from the actuating chamber to disengage the friction device, a balance fluid pressure will be developed in the balance chamber due to centrifugal force which will balance the pressure developed in the actuating chamber by the centrifugal force of the residual fluid whereby the piston will not be moved to apply the friction device when the device is disengaged and the housing for the device is rotating. Further, control over the engagement of the friction device is simplifed since no sudden closure of an escape passage by a ball mechanism is involved.

DESCRIPTION OF THE DRAWINGS

The single figure of the drawing is a cross-sectional view of a portion of a transmission structure embodying the principles of the present invention.

Referring to FIG. 1, a fluid actuator 10 for a friction device is illustrated. The actuator 10 is illustrated in a transmission structure including a stationary transmission case 11 having an input shaft 12 and a pair of concentric intermediate shafts 13 and 14 for transmitting the drive to the gearing portion of the transmission. The stationary case has a flange portion 15 which receives a stationary hollow shaft 16 and in which the input shaft 12 is piloted. Mounted on the flange 15 and on the concentric shafts 13 and 14 is a clutch housing 20 adapted for rotation. The housing 20 has an outer annular portion 21 and end walls 22 and 23. Extending from the end wall 23 is an inner annular flange 24 which, together with the end wall 23 and the outer annular portion 21, defines a stepped annular chamber 26 containing the actuator device 10.

Provided on the end wall 22 is an inner annular flange 27 which defines with the wall 22 and the outer annular portion 21 a second annular chamber 30. Contained within the annular chamber 30 is an actuating piston 31 and contained within the annular chamber 26 is an actuating piston 33.

Intermediate shaft 14 has a clutch drum 35 drivingly connected thereto, for example, by splines 36. Intermediate shaft 13 has a clutch drum 38 drivingly connected thereto, for example, by splines 39. The outer annular portion of the housing 20 includes splines 40 and 41. The clutch drums 35 and 38 have outer driving splines 43 and 44 respectively.

The device includes a pair of clutch structures 50 and 51 which may be alternately or simultaneously engaged by the pistons 31 or 33 to transfer the drive from the input shaft 12 either to clutch drum 38 or clutch drum 35 to drive the intermediate shaft 13 or 14. Each of the clutches 50 and 51 includes annular clutch discs 53 drivingly connected to the splines 40 or 41 and annular clutch discs 54 drivingly connected to the outer driving splines 43 and 44 of clutch drums 35 and 38 respectively. A clutch pressure plate 55 is provided axially movable on splines 41 by the piston 33 to engage clutch discs 53 and 54 of clutch 51. Clutch discs 53 are shown as dished discs, however, the device works well with flat discs such as discs 54 and the use of dished discs is not necessary.

The actuator for clutch 50 includes an apply chamber 58 for piston 31 and a centrifugal ball mechanism 60 for relieving pressure developed in the apply chamber 58 through exhaust port 59 when the clutch is disengaged and the housing 20 is rotating. A wave-type spring 57 is provided on flange 27 in engagement with piston 31 to return the piston when the clutch 50 is disengaged.

A fluid passage 61 is provided adapted to communicate fluid pressure to the actuator 10. The passage 61 extends through the end wall 22 and the outer annular portion 21 of housing 20 to the actuator 10. A second fluid passage 63 is illustrated in hidden lines in the drawing to communicate fluid pressure to the apply chamber 58 for piston 31. A groove 65 is provided in flange 15 to supply fluid pressure to fluid passage 61 and a groove 66 is provided in flange 15 to supply fluid pressure to passage 63. Piston 31 together with the end wall 22, inner flange 27 and outer annular portion 21 define apply chamber 58 for piston 31. The piston 33 together with end wall 23 and inner flange 24 and outer annular portion 21 define an apply chamber 72 in the chamber 26. Piston 33 has a stepped bore 80 therein. An annular plate 81 is provided mounted in the stepped bore 80 on flange 24 and held in place by a snap ring 83. The annular plate 81 together with the stepped bore 80 of piston 33 and flange 24 defines a pressure-balancing chamber 85. Provided within the balance chamber 85 is a return spring 86 for the piston 33, the return spring engaging the piston 33 and the plate 81. A bore 90 is provided in intermediate shaft 14 which is adapted to communicate lubricating fluid from the area between shafts 13 and 14 to the splines 36 and to the area around flange 24. A bore 91 is provided in the flange 24 which communicates the lubricating fluid received from the bore 90 to the balance chamber 85.

The operation of this device is that either the clutch 50 or clutch 51 will be engaged by supply of fluid pressure to fluid passage 61 or fluid passage 63. When fluid pressure is exhausted from passage 63 so as to disengage clutch 50, return spring 57 returns the piston 31 to the left and the clutch assembly is disengaged. Any retained fluid within the apply chamber 58 for piston 31 can be exhausted when the housing 20 is rotated due to centrifugal force acting on ball 60 to open exhaust port 59 for the chamber 58.

In the case of the clutch actuator 10 the balance chamber 85 acts to prevent the clutch 51 from being inadvertently engaged during the period when fluid pressure is exhausted from actuator 10 for clutch 51 through fluid passage 61 and the housing is rotating. In the condition in which clutch 51 is to be disengaged and no pressure supplied through passage 61, spring 86 returns the piston 33 to the right to disengage clutch 51. If, when fluid pressure is developed due to centrifugal force acting on the residual fluid within passage 61 and apply chamber 72, the pressure developed will tend to move piston 33 to the left and may inadvertently engage clutch 51. However, the lubricating fluid supplied through bore 91 into balance chamber 85 will also be effected by centrifugal force when housing 20 is rotating and will develop a balancing fluid pressure in chamber 85 to maintain the piston 33 in its disengaged position to the right against the force of fluid pressure developed by the centrifugal force in apply chamber 72.

Thus the present invention provides a convenient method for balancing fluid pressures under centrifugal force to prevent inadvertent engagement of the clutch 51 in an environment where the centrifugal ball such as the structure 60 would be ineffective to release the centrifugal pressure head developed when the clutch housing 20 is rotated. Thus the present invention is a convenient means of balancing the centrifugal pressure head wherein lubricating fluid is supplied to a balance chamber area and will thereby keep the actuator in its disengaged position when desired.

As will be apparent, the actuator 10 may be readily used in other environments where a source of fluid under low pressure is available and in which the centrifugal pressure head on an actuating piston must be balanced. The device is shown for the purposes of illustration in which a pair of clutches are used and in which one of the clutches was adaptable to the known method of relieving the centrifugal pressure head. Moreover, the actuator 10 may be used in environments where any device is to be moved axially in a rotating structure to perform some work as, for example, in brake structures or other rotating devices requiring an axial movement responsive to fluid pressure.

Various of the features of the invention have been particularly shown and described; however, it should be obvious to one skilled in the art that modifications may be made therein without departing from the scope of the invention.

I claim:

1. In an actuator for an engageable friction device, a rotary housing having an annular chamber with an annular piston slidably mounted therein, an actuation chamber formed in said rotary housing on one side of said piston, an annular plate fixedly mounted in said housing and defining a balance chamber on the other side of said piston, a source of fluid pressure, fluid passage means in said rotary housing and spaced radially outwardly of said annular chamber connected to said actuating chamber and connectable to said source of fluid pressure, piston return means adapted to return said piston when fluid is exhausted from said actuating chamber; a lubricating fluid passage for said device connected to said balance chamber, and said side of said piston associated with said balance chamber having a larger area exposed to fluid in said balance chamber than the area of the side of said piston exposed to fluid within said actuation chamber whereby when fluid is exhausted from said actuating chamber centrifugal force acting on residual fluid in said actuating chamber and passage will be ineffective to engage said friction device due to an opposing force developed by centrifugal force acting on the fluid in said balance chamber.

Dedication 3,581,858.—*William J. Haley*, Muncie, Ind. FLUID ACTUATOR. Patent dated June 1, 1971. Dedication filed July 26, 1971, by the assignee, *Borg-Warner Corporation*.

Hereby dedicates to the People of the United States the entire remaining term of said patent.

[*Official Gazette November 16, 1971.*]